UNITED STATES PATENT OFFICE.

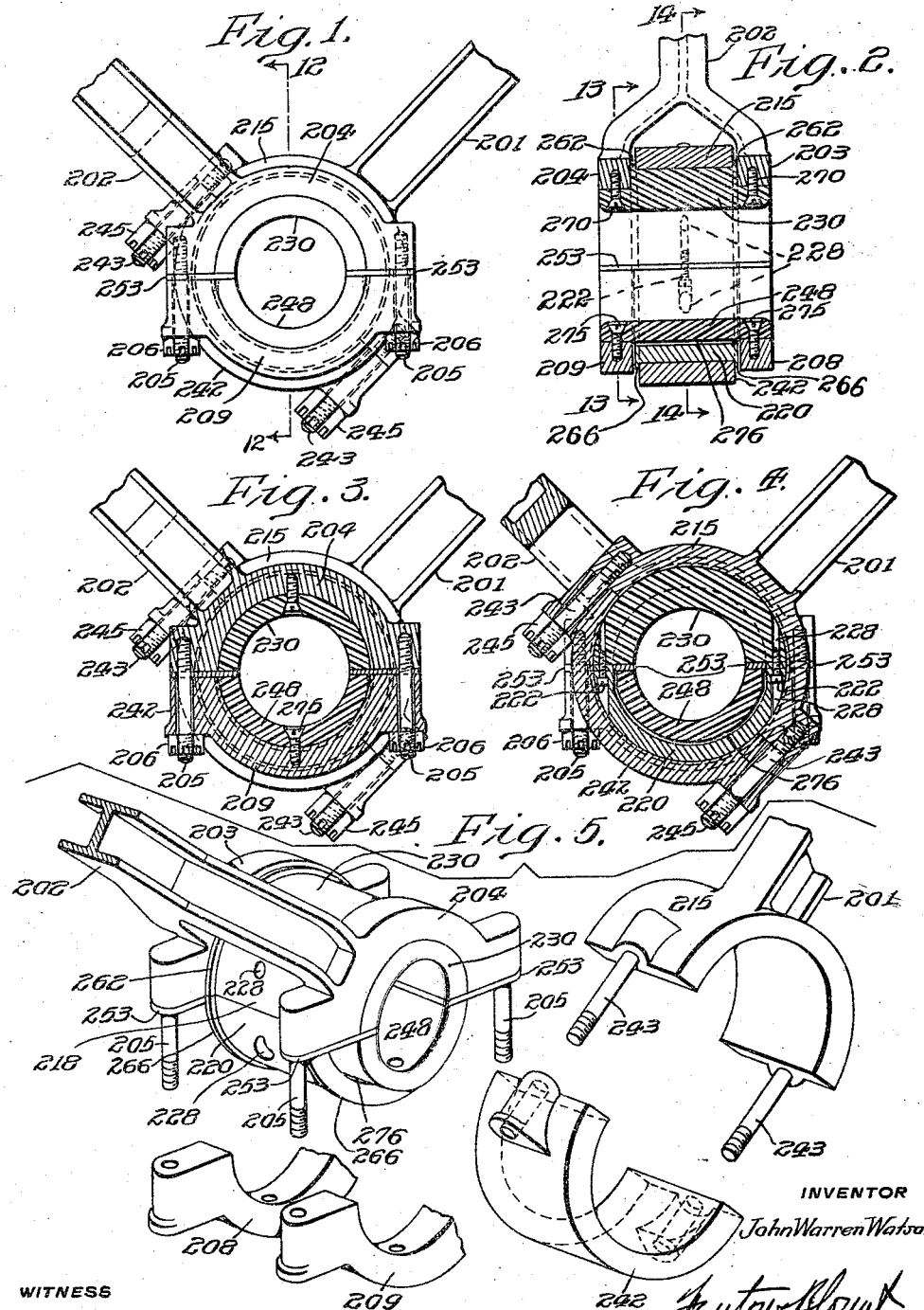

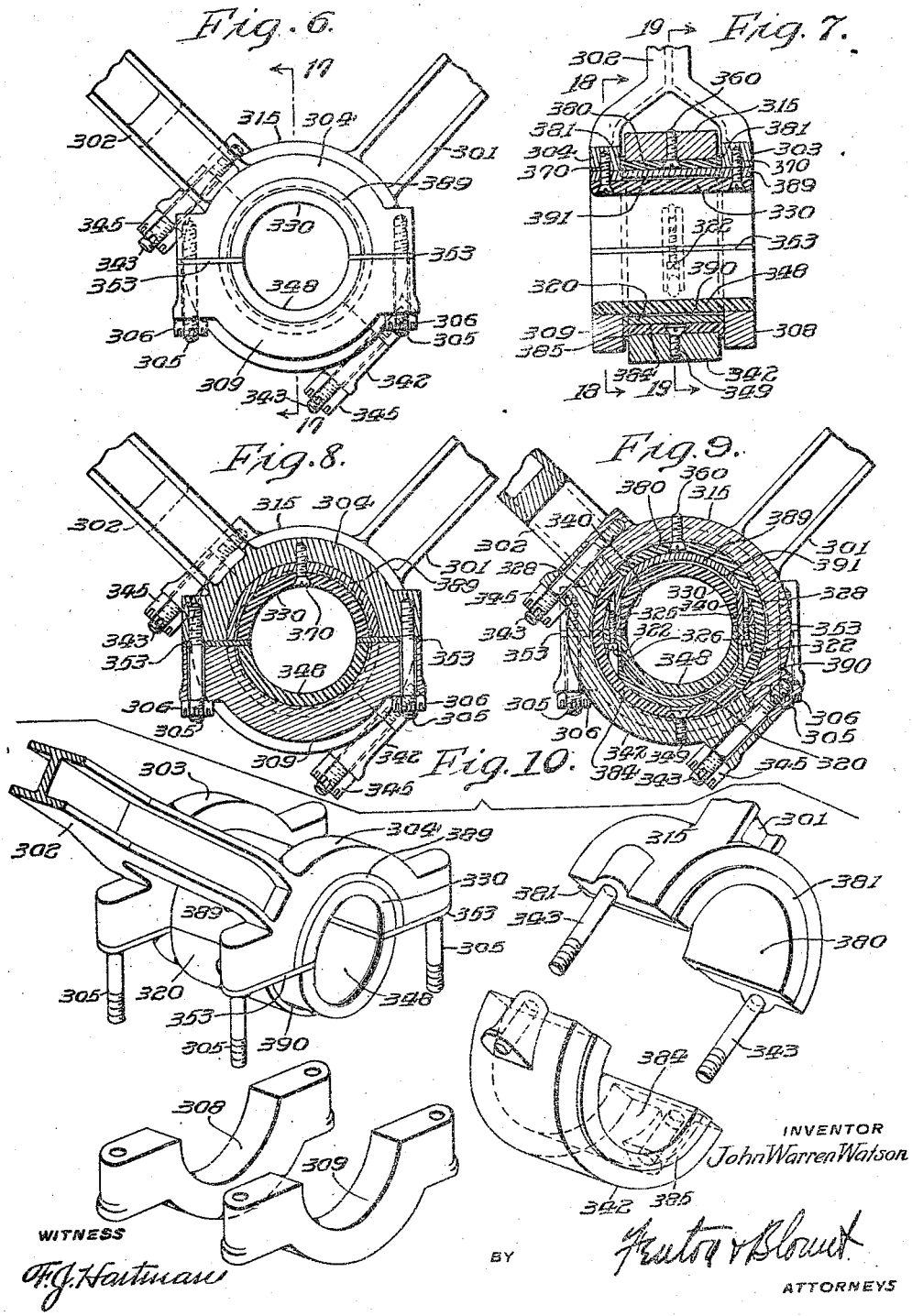

JOHN WARREN WATSON, OF WAYNE, PENNSYLVANIA.

MULTIPLE-CONNECTING-ROD ASSEMBLY.

1,286,852. Specification of Letters Patent. Patented Dec. 3, 1918.

Original application filed June 15, 1915, Serial No. 34,318. Divided and this application filed August 22, 1917. Serial No. 187,600½.

*To all whom it may concern:*

Be it known that I, JOHN WARREN WATSON, a citizen of the United States, and a resident of Wayne, county of Delaware, State of Pennsylvania, have invented certain new and useful Improvements in Multiple-Connecting-Rod Assemblies, of which the following is a specification, reference being had to the accompanying drawings, this application being a division of another application filed by me June 15, 1915, Serial No. 34,318.

My invention relates to bearing assemblies for multiple connecting rods arranged to exert power impulses upon a single crank pin or to be driven from a single crank pin, and is especially adapted for use in internal combustion motors in which a plurality of cylinders are arranged longitudinally of a single crank shaft, the axes of the cylinders being in angular relation with each other. Internal combustion motors of this type, known as "V-type" motors, having recently come into very general use in marine, aeroplane and automobile practice, it being customary in such motors to so arrange the cylinders with respect to a single crank shaft that the power impulses in any given pair of cylinders having their longitudinal axes in angular relation, may be transmitted by means of suitable pistons and connecting rods to exert rotative force upon a single crank pin. It therefore becomes necessary to provide a suitable bearing in which the crank pin may rotate with respect to the connecting rods, and also to provide suitable bearing surfaces to permit of a relative oscillation between each pair of rods, and in motors as at present constructed widely dissimilar means have been utilized to accomplish this result. In one construction employed, two independent connecting rods of ordinary type are arranged side by side and longitudinally of the crank pin, the axes of the connecting rods being correspondingly longitudinally off-set. This construction permits of the ready adjustment of the bearing surfaces in the ordinary manner, but is open to the objection that with a given length of crank pin the bearing surface of each rod thereon is necessarily reduced to about half of the area it would be possible to employ were but a single rod utilized, necessitating frequent adjustment. For the purpose of overcoming this objection another type of connecting rod bearing assembly has been devised, in which one of the rods is arranged to oscillate with respect to the other rod upon the exterior of a longitudinally split bearing-metal box fixed with respect to the other rod and surrounding the crank pin, which revolves therein. Thus a bearing surface substantially equal to the total superficial area of the crank pin is obtained, but this construction is open to the objection that any adjustment of this bearing surface to compensate for wear, necessarily distorts or changes the external contour of the box, so that after such adjustment has been made by removing the shims or liners from between the contacting edges of the halves of the bearing or by dressing off these edges in the well-known manner, the exterior surface of the box assumes an oval contour instead of a perfectly cylindrical one, destroying its usefulness as a bearing surface for the oscillating rod. Hence while in this type of bearing a maximum amount of bearing surface is obtained upon the crank pin to receive the impulses from the cylinders, the least wear between the parts entails the expense of entirely new bearing boxes, as well as the cost of disassembling the motor for the purpose of substituting them in place of the worn boxes, whereas in the type of bearing first described in which two rods are placed side by side upon the crank pin, although the bearing may be adjusted upon the occurrence of wear and without disassembling the whole motor, the bearing area of each rod is so materially reduced that with a given length of crank pin much more frequent adjustment is necessary than in a construction in which the maximum bearing surface is obtained.

A principal object, therefore, of my invention is to provide a multiple connecting rod assembly which shall combine the advantages of both types hitherto described and which shall possess none of the disadvantages of either as hitherto pointed out; which shall provide a maximum bearing surface for the crank pin, and in which either the crank pin bearing or the bearing upon which the relative oscillation of the connecting rods takes place may be adjusted as desired without permanently disturbing the contour or adjustment of the other bearing. Further objects of my invention are to provide a multiple connecting rod assembly having the foregoing characteristics which shall be adapted for use in the various types of motors at present employed in marine, aeroplane and automobile practice as well as in other motors and machinery; which may be constructed without a material increase in cost over the types of assemblies at present in use, and which may be readily assembled or adjusted without the use of special tools and by an ordinary mechanic.

My invention further includes all of the other various objects and novel features of construction and arrangement hereinafter more definitely specified.

In the accompanying drawings in Figures 1 to 5 inclusive is illustrated one embodiment of my invention, Fig. 1 being a side elevation thereof in assembled position; Fig. 2, a central vertical section thereof taken on line 12—12 in Fig. 1; Fig. 3, a transverse vertical section taken on line 13—13 in Fig. 2 looking in the direction of the arrows; Fig. 4, a similar section taken on line 14—14 in Fig. 2 also looking in the direction of the arrows, and Fig. 5, a perspective view of the invention disassembled and illustrating the various parts in their proper relation and ready for assembly. In Figs. 6 to 10 inclusive, is illustrated a slightly modified form of the invention, these figures corresponding respectively to Figs. 1 to 5 inclusive hereinbefore referred to.

Referring now more specifically to that embodiment of the invention illustrated in Figs. 1 to 5 inclusive, a pair of connecting rods 201 and 202 are provided, the outer ends of which are suitably connected to pistons, (not shown) through which the power impulse is transmitted to the rod, or in certain types of machinery, through which the power may be transmitted from a crank pin. Rod 202 is laterally forked adjacent its lower end and provided with a pair of downwardly directed substantially semi-circular yokes 203, 204 the lower faces of the extremities of the yokes being preferably in angular relation with the longitudinal axis of the connecting rod, the angle varying according to the design of the motor in which the connecting rod is intended for use, and being generally in the neighborhood of 45 degrees, the yokes being fitted with suitable threaded studs 205 for the reception of nuts 206 in the usual manner. A pair of substantially semi-circular caps 208, 209 corresponding to the yokes 203, 204 are provided, and arranged for the passage of studs 205 so that they may be drawn upwardly against the lower faces of the yokes and retained in position thereon by nuts 206, when the invention is assembled.

The rod 201 is provided adjacent its lower end with a substantially semi-cylindrical boss 215 laterally extended on either side of its median line and slightly less in width than the distance between the adjacent inner faces of yokes 203, 204, the faces of its lower extremities being preferably substantially normal to the longitudinal axis of the rod. The inner surface of the boss is preferably machined to a radius of curvature somewhat greater than that of the crank pin of the motor, and a semi-cylindrical bearing-metal liner 230, hereinafter referred to as the "brass", which may, if desired, be babbitt lined and provided with suitable oil grooves in the ordinary manner, neither the babbitt lining nor the grooves being shown in the drawing, however, for the sake of clearness, is provided, the brass having an internal radius of curvature substantially equal to that of the crank pin of the motor and being adapted to form the upper half of the crank pin bearing. The central portion of this brass for a width equal to that of boss 215 is machined to a radius of curvature substantially equal to that of the interior of the boss and the ends of the brass are machined to a radius of curvature equal to that of the interior of yokes 203, 204 and caps 208, 209, so that when the caps and yokes are assembled, as hereinafter described, the yokes will form a snug fit around the ends of the brass. If desired, a pair of small outwardly projecting flanges 262 may be provided for the purpose of filling up the clearance formed between the ends of boss 215 and the adjacent faces of the yokes when the parts are assembled.

For the purpose of completing the cylindrical bearing for the crank pin another substantially semi-cylindrical brass 248 is provided, this brass similarly to brass 230, being of a length substantially equal to that of the crank pin upon which the bearing is designed to operate, and arranged to be secured in fixed relation with caps 208, 209 by means of screws 275 or other suitable fastening means, a pair of suitable shims 253 being preferably provided to extend longitudinally between the adjacent faces of brasses 230 and 248 when the device is assembled, the shims having outwardly extending lugs conforming to the shape of the ends of yokes 203, 204, in which lugs suitable apertures are provided for the passage of studs 205. Brass 248 may be provided with oil grooves (not shown) in the usual manner.

For the purpose of forming a cylindrical bearing surface upon which rod 201 may oscillate, a half ring 220 of bronze or other suitable bearing metal and preferably very slightly less in width than the distance between the adjacent faces of caps 208, 209 when in position on studs 205 is provided and arranged to be secured in fixed relation with brass 230 by means of screws 222, or other suitable fastening devices, located in vertically extending apertures 228 formed in the half ring and in the brass 230, preferably midway between the ends of these parts. The inner radius of curvature of half ring 220 is preferably somewhat greater than that of the exterior of brass 248, so that a small clearance 276 will be left between the interior of the half ring and the exterior of the brass when the parts are assembled, as clearly shown in Fig. 2, and if desired, the half ring may be provided with a pair of outwardly directed flanges 266 corresponding to flanges 262 previously referred to. A suitable semi-cylindrical cap 242, equal in width to the width of boss 215 and adapted for engagement on studs 243, in which position it may be secured by nuts 245, is provided, the interior of the cap being finished on a radius of curvature substantially equal to that of the exterior of half ring 220, so that when the cap is positioned on studs 243 and drawn up against boss 215, a snug working fit may be secured upon the cylindrical bearing surface 218 formed by the surface of brass 230 and of the half ring 220, upon which surface rod 201 will be free to oscillate relative to rod 202 and the brasses forming the crank pin bearing, the relative movement of the rods occurring about a common center.

The various parts of this form of the invention having been constructed preferably substantially as hereinbefore described, the method of assembling the same, as clearly shown in Fig. 5, may now be referred to as follows: The brass 230 having been secured within yokes 203, 204 by means of screws 270, is placed in operative relation with the crank pin, and brass 248 carrying caps 208, 209, adjusted by regulating the thickness of shims 253 or dressing off the upper faces of the brass and caps in such manner that when the yokes are positioned upon studs 205 with nuts 206 in place, a good working fit is formed by brasses 230 and 248 around the crank pin. The half ring 220 is next positioned around the center of brass 248 and between caps, 208, 209, and secured in fixed relation with brass 230 by means of screws 222, the heads of which are countersunk below the exterior surface of the half rings. Rod 201 is then brought down over the center of brass 230 and cap 242 positioned over the half ring 220 and secured in fixed relation with boss 215 by means of studs 243 and nuts 245. It will be evident that with the parts assembled as just described, brasses 230 and 248 are maintained in fixed relation with yokes 203, 204 and caps 208, 209, forming a cylindrical bearing surrounding the crank pin and in which it is free to rotate, the yokes and caps being also respectively maintained in fixed relation with each other, and further, that half ring 220 is also held in fixed relation with the several parts referred to, the whole forming an operatively unitary structure with the rod 201 free to oscillate with respect thereto upon the outer central surface of brass 230 and the outer surface of half ring 220, which, together, form a true cylindrical surface 218.

Owing to the rotation of the crank pin within the brasses 230 and 248, the wear at this point is relatively great, necessitating periodic adjustment of the brasses, which may be readily accomplished by first removing cap 242 and half ring 220, after which caps 208, 209, carrying brass 248, may be removed, and the thickness of shims 253 then decreased in the usual manner. After such adjustment has been made the caps 208, 209 and brass 248 may be replaced, the half ring 220 again secured in position, rod 201 brought to its bearing and cap 242 secured in operative relation with the rod, without permanently destroying or in any way altering the contour of surface 218 upon which rod 201 is arranged to oscillate. Furthermore, in like manner, adjustment to compensate for wear between the rod 201 and its respective bearing surface may be readily made by dressing off the upper face of cap 242 without destroying or altering the operative adjustment of the surfaces of the brasses bearing upon the crank pin, so that either bearing may be adjusted without in any way permanently affecting the adjustment or contour of the other bearing. It is found, however, that owing to the relatively small movement which takes place between rod 201 and the surface on which it oscillates, the wear at this point is practically negligible so that the necessity of adjustment at this point arises very infrequently.

While in the form of the invention just described, it is considered advisable to permanently fasten brass 248 to caps 208, 209 by means of screws 275 as shown in the drawings, it may be desirable in certain constructions to dispense with such fastening means, as it will be evident that brass 248 when drawn up against shims 253 by nuts 206 acting against caps 208, 209, will be prevented from any movement with respect to any of the several parts maintained in operatively fixed relation with rod 202.

Referring now to the slightly modified form of the invention, shown in Figs. 6 to 10 inclusive, Fig. 6 is a side elevation thereof showing the parts in assembled position; Fig. 7 a central vertical section thereof taken on line 17—17 in Fig. 6 looking in the direction of the arrows; Fig. 8 a transverse vertical section taken on line 18—18 in Fig. 7, looking in the direction of the arrows; Fig. 9 a similar section taken on line 19—19 in Fig. 7, also looking in the direction of the arrows, and Fig. 10 a perspective view of this form of the invention partially disassembled and showing the various parts in their proper relation and ready for assembly.

In this form of the invention, connecting rods 301, 302 are provided, the former being laterally forked adjacent its lower end and provided with yokes 303, 304, substantially similar to yokes 203, 204 previously described, and fitted with studs 305 threaded for the reception of nuts 306 adapted to maintain caps 308, 309 in position upon the studs when the invention is assembled.

The rod 301, similarly to rod 201, is provided with a laterally extended, substantially semi-cylindrical boss 315, and a semi-cylindrical internal bronze or other bearing-metal liner 380, preferably provided with oil grooves (not shown) is secured therein by means of a screw 360, or other suitable fastening means, the head of the screw being countersunk below the interior surface of the liner. The ends of the liner may be provided with small outwardly directed flanges 381 adapted to project partially over the ends of the boss when the liner is in position therein, the length of the liner being preferably slightly greater than the width of the boss. A cap 342, adapted for engagement upon the threaded studs 343 with which boss 315 is fitted and suitable for the reception of nuts 345, is also provided with a similar liner 384 having similar outwardly directed flanges, the liner being secured in fixed relation with the cap by means of a screw 349 or other suitable fastening means.

For the purpose of forming the upper half of the bearing designed to engage the crank pin, a semi-cylindrical brass 330 is provided and secured in fixed relation with the yokes 303, 304 by means of upwardly directed screws 370, or other suitable fastening means, the brass, which is preferably provided with oil grooves (not shown), having an inner radius of curvature equal to that of the crank pin. Interposed between the exterior surface of brass 330 and the yokes, and, when the parts are assembled, forming a bearing for portions of the liners 380, 384, is a semi-cylindrical shell 389 of steel or other suitable metal, the exterior of the shell being machined all over upon a radius of curvature equal to the radius of curvature of the interior of liners 380, 384 and of the openings within yokes 303, 304, suitable apertures being provided through which screws 370 or other suitable fastening means extend, whereby brass 330 and shell 389 may be secured in fixed concentric relation within the yokes with the upper part of the shell exposed between the yokes as clearly shown in Fig. 10.

For the purpose of completing the cylindrical bearing for the crank pin, another semi-cylindrical brass 348, preferably machined all over, is provided, its interior radius of curvature being equal to that of the crank pin and its exterior radius of curvature being equal to that of brass 330, so that when caps 308, 309 are positioned on studs 305 and drawn up by nuts 306, the ends of brass 348, which is equal in length to brass 330, both brasses being substantially equal in length to the length of the crank pin, will be gripped by the caps, and the brass 348 maintained in fixed relation with brass 330, yokes 303, 304, and rod 302, suitable shims 353, comprising outwardly extending lugs conforming to the shape of the yokes, being preferably provided and positioned to extend longitudinally between the adjacent faces of the brasses as previously described in connection with shims 253. If desired, the brass 348 may be permanently secured in fixed relation with caps 308, 309 in a manner similar to that in which brass 248 is shown as secured to caps 208, 209, or, as shown in the drawings, brass 348 may be unattached to the cap, being, however, held in fixed relation with the other parts when assembled by means of the caps, which tend to force it upwardly against the shims, which, in turn, contact with the fixed brass 330.

For the purpose of forming a cylindrical bearing upon which rod 301 carrying liners 380, 384 may oscillate, a half ring 320 of steel or other suitable material, preferably equal in length to the distance between the adjacent faces of yokes 303, 304, is provided, the radius of curvature of the exterior of the half ring being equal to that of shell 389 and the interior radius of curvature being a little greater than the exterior radius of curvature of brass 348, so that when the half ring is in position surrounding the brass, as hereinafter described, a small clearance 390 will be left between the adjacent surfaces. The half ring 320 may be secured in fixed relation with shell 389 by any suitable fastening means, those shown comprising suitably upwardly extending screws 322, and for the purpose of affording space for the reception of the screws a pair of inwardly directed lugs 325 are arranged on the interior of the shell, preferably midway between the ends thereof, and a corresponding pair of lugs 326 on the interior of the half ring, suitable apertures 328 being formed in the lugs for the reception of the screws 322. Of course, in a construction large enough to permit of the thickness of the half ring and shell being made sufficiently great to properly accommodate the apertures for the reception of the screws the lugs could be omitted, but in constructions of the ordinary size, the relative thinness of the half ring and shell necessitates the use of the lugs or some other equivalent means to afford sufficient space for the reception of the screws. In order to permit brass 330 to snugly seat within the shell, and in a similar manner to permit the half ring to be secured in relatively close relation with brass 348, it is necessary to mill off the sides of the brasses as at 340 for a distance slightly greater than the lateral width of the lugs in order to accommodate the latter, as clearly shown in Fig. 9. Furthermore, as owing to the inwardly projecting lugs, it is extremely difficult to machine the entire interior of the shell, in practice the latter may be cast or otherwise formed so that its initial unfinished interior diameter adjacent the lugs will be somewhat greater than the interior diameter of its finished end portions, thus avoiding the necessity of machining the interior of the center of the shell, and resulting in a slight clearance 391 being left between the exterior of the brass 330 and the interior of the shell adjacent the lugs when the parts are assembled.

The various parts of this form of the invention having been constructed preferably substantially as hereinbefore described, the same may be assembled in a manner very similar to that previously referred to in connection with the form shown in Figs. 1 to 5 inclusive, namely, by first securing shell 389 and brass 330 in fixed relation with rod 302 by means of screws 370, and then bringing the brass down over the crank pin designed to revolve therein. The brass 348 is next adjusted by means of shims 353 so that when caps 308, 309 are secured in position on studs 305 by nuts 306 a good working fit will be secured between the brasses and the crank pin. Half ring 320 is then positioned beneath brass 348 and secured in position on shell 389 by means of screws 322 located in apertures 328, after which rod 301 is brought down over the exteriors of shell 389 and half ring 320, the liners 380, 384 having been secured respectively in boss 315 and cap 342, and cap 342 secured in position on studs 343 by nuts 345. In Fig. 10, for the purposes of illustration, caps 308, 309 are shown removed from studs 305, and half ring 320 shown in position on shell 389, although as previously described, it is preferable to assemble the brasses 330 and 348 around the crank pin and to attach the caps to the yokes, with shims 353 between the adjacent faces of the caps and yokes before attaching half ring 320 to the shell.

With the parts assembled as hereinbefore described, the brasses, shims, shell 389, and half ring 320, together with caps 308 and 309, are maintained in fixed operative relation with rod 302, forming a substantially unitary structure, and rod 301 is free to oscillate relatively to rod 302 upon the surfaces of the shell and half ring between yokes 303 and 304, the center of relative oscillation being common to both rods. Furthermore, adjustment of brasses 330 and 348 engaging the crank pin may be readily made in a manner substantially similar to that described in connection with the form of the invention illustrated in Figs. 1 to 5 inclusive, without in any manner permanently disturbing, destroying or in any way altering the contour of the truly cylindrical surface upon which rod 301 is free to oscillate, while adjustment of the relative position of cap 342 and boss 315 may also be made without changing the contour, or altering the operative adjustment, of the surfaces of the brasses engaging the crank pin, so that, as in the form of the invention previously described, the adjustment of either bearing may be effected without in any way permanently changing the adjustment or contour of the other bearing.

It will thus be evident that my invention provides a multiple connecting rod assembly in which the rods are arranged for relative movement about a common center, and in which a maximum bearing surface, commensurate with the length of the crank pin, is provided for the reception of the impulses transmitted to the crank pin from the cylinder, so that the wear between the crank pin and the bearing surface on which it revolves is reduced to a minimum, and in which, when it does become necessary to adjust either the crank pin bearing or the bearing upon which the relative oscillation of the rods takes place, proper adjustment of either bearing may be readily made without permanently disturbing or destroying the contour of the other bearing.

Furthermore, while for the purpose of making clear to those skilled in the art both the construction and operation of my invention, I have herein described and illustrated certain forms thereof with considerable particularity, I in no way desire or intend to limit myself specifically thereto, or to the exact construction and arrangement of the various parts of the invention so illustrated and described, for various changes may be made in the details of construction and arrangement and suitable modifications effected, as desired, to adapt the invention to the varying conditions encountered in practice without department from the spirit and scope of the invention, as defined in the appended claims.

Having thus described my invention, I claim and desire to protect by Letters Patent of the United States:

1. In mechanism, the combination with a plurality of connecting rods adapted to transmit impulses to a single crank pin and one of said rods comprising a forked end, of a bearing adapted to engage said crank pin and extending for substantially the full length thereof in fixed operative relation with the rod having said forked end, and a second bearing substantially concentric with said first-mentioned bearing upon which another of said rods is free to oscillate, either of said bearings being adjustable without disturbing the contour of the other of said bearings.

2. In mechanism, the combination with a connecting rod having a forked end, of a brass in fixed operative relation with said rod and forming a bearing surface surrounding a crank pin, and another connecting rod adapted to oscillate about a center common to both rods upon a bearing surface substantially surrounding said brass and intermediate of the forks of the first-mentioned rod, either of said bearing surfaces being adjustable without changing the contour of the other of said surfaces.

3. In mechanism, adaptable for use in connection with a plurality of connecting rods, one of said rods having a forked end, a bearing in fixed operative relation with said rod and adapted to engage a crank pin, and a second bearing substantially concentric with said first-mentioned bearing upon which another of said rods is free to oscillate, either of said bearings being adjustable without disturbing the contour of the other of said bearings.

4. In mechanism, the combination of a crank pin bearing adapted to be fixed with relation to a forked connecting rod and a bearing for another connecting rod, either of said bearings being adjustable without changing the contour of the other.

5. In mechanism, a bearing assembly adapted for use in connection with a plurality of elements, including a bearing surface in fixed relation with one of said elements having a forked portion and a bearing surface for another of said elements, either of said bearing surfaces being capable of adjustment without varying the contour of the other.

6. In combination, three members, constituting a complete bearing assembly, forming a plurality of substantially concentric bearing surfaces, any one of said surfaces being adjustable without changing the contour of another of said surfaces.

7. A bearing assembly, including a plurality of members, forming a plurality of substantially concentric bearing surfaces, any one of said surfaces being capable of adjustment without changing the contour of another and one of said surfaces being in fixed relation with a forked element.

8. A bearing assembly, including a bearing in fixed relation with a forked element and a second bearing substantially concentric with the first-mentioned bearing, either of said bearings being adjustable without varying the contour of the other.

In witness whereof, I have hereunto set my hand this 14th day of August, A. D. 1917.

JOHN WARREN WATSON.

Copies of this patent may be obtained for five cents each, by addressing the "Commissioner of Patents, Washington, D. C."